Aug. 1, 1933.  J. SCHMIEDEL  1,920,810
PROCESS FOR MAKING CIGARETTE CARTONS
Filed Sept. 23, 1930   7 Sheets-Sheet 1

Inventor
Johannes Schmiedel
by Max D. Ordmann
Attorney

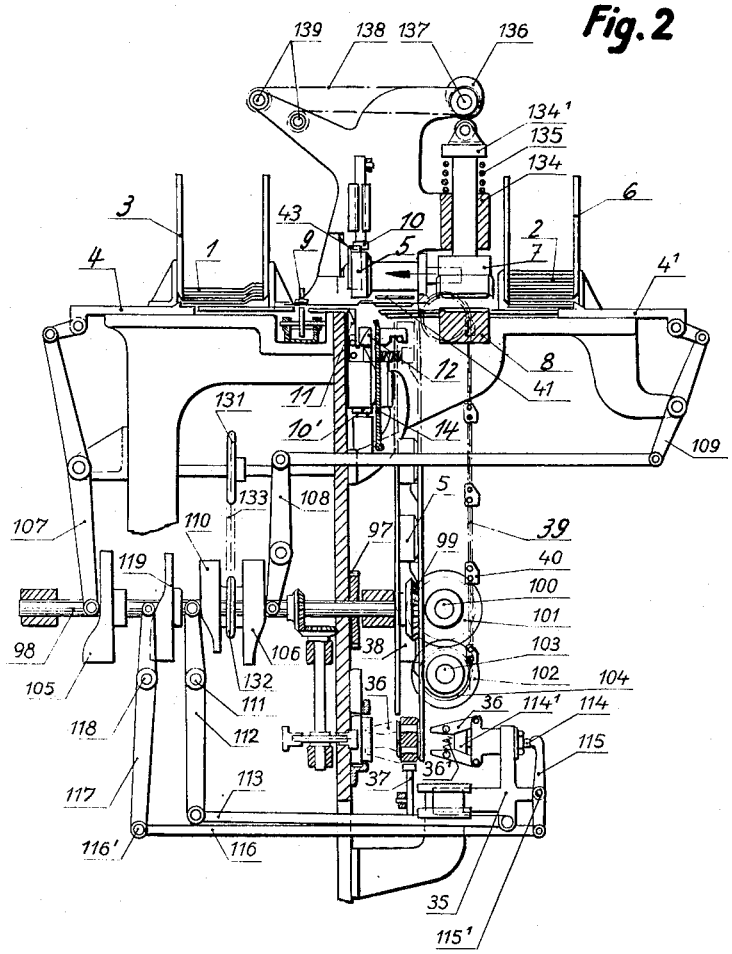
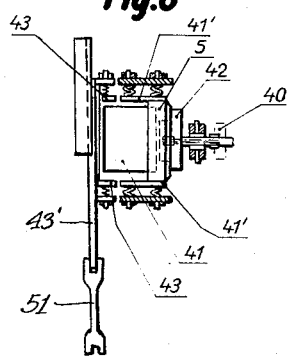

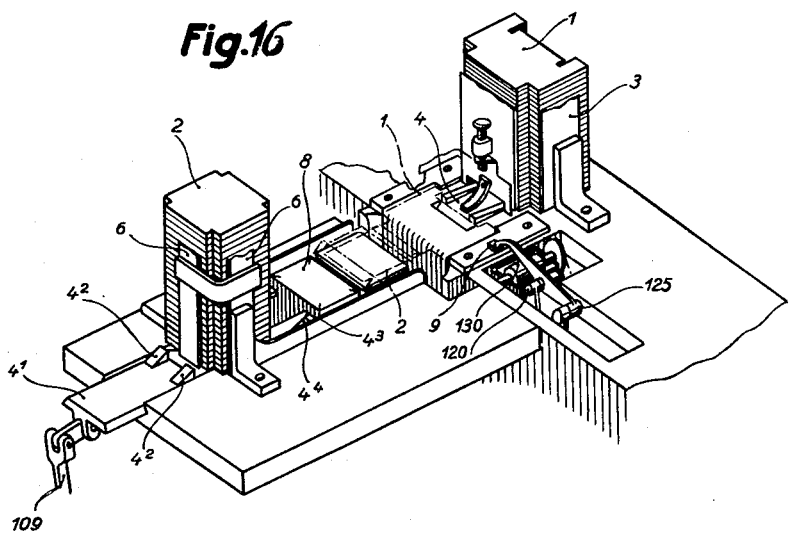

Aug. 1, 1933.  J. SCHMIEDEL  1,920,810
PROCESS FOR MAKING CIGARETTE CARTONS
Filed Sept. 23, 1930  7 Sheets-Sheet 7

Patented Aug. 1, 1933

1,920,810

UNITED STATES PATENT OFFICE 1,920,810

PROCESS FOR MAKING CIGARETTE CARTONS

Johannes Schmiedel, Dresden, Germany, assignor to the Firm Universelle Cigarettenmaschinen-Fabrik, J. C. Muller & Co., Dresden, Germany Application September 23, 1930, Serial No. 483,772, and in Germany October 1, 1929

6 Claims. (Cl. 93—39)

The invention is an improvement in the process for making cigarette cartons or boxes described in the patent application of which the serial number is 391,063, filed September 7, 1929 by Carl Wilhelm Müller for Method of and apparatus for the production of curved boxes by which no special neck strip is required for fitting the wings over the edges of the box portion.

The blanks are subjected to the process described in the above-mentioned application and the box wing portions of these blanks are bent and stamped as described in the patent application of which the serial number is 391,064, filed September 7, 1929, by Carl Wilhelm Müller for a Cigarette carton, in order to form the shoulder of the box.

By the present process separate blanks are used for the box part and lid part without its being necessary to previously secure the blanks together.

According to this invention, both blanks are brought from different sides under the former and over the die channel, so that the neck of the box wing coincides with the corresponding wing of the lid portion. The former is forced down, presses the superposed parts together and forces them in correct relation to one another into the die channel. The final connection is effected by an edge strip, which is applied in the manner described in application No. 391,063.

In the accompanying drawings, which illustrate the process according to the invention, Fig. 1 is a longitudinal section of the machine.

Fig. 2 is a cross-section thereof.

Fig. 3 is a plan and

Fig. 4, a side view of the blanks.

Fig. 5 shows a completed box with lid.

Figure 1:
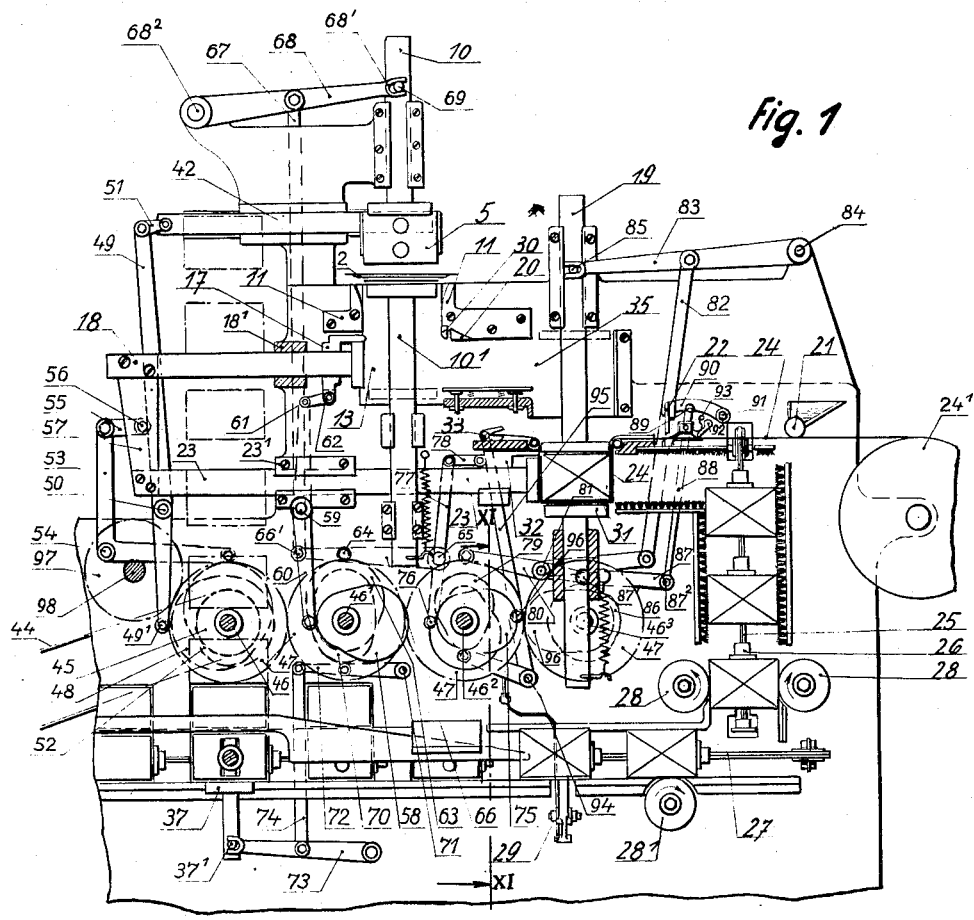
Figure 10:
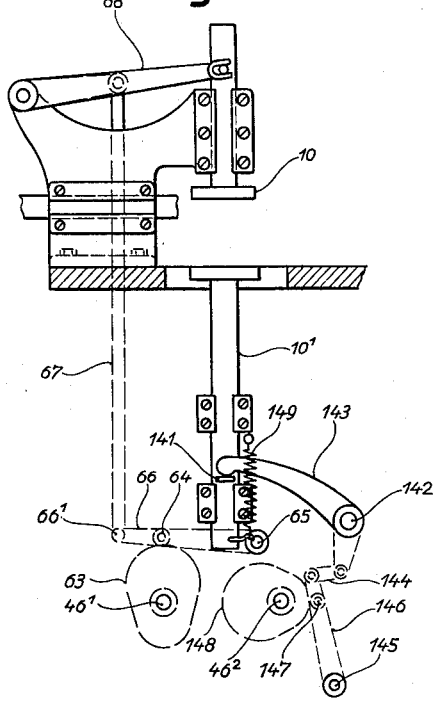
Figure 14:
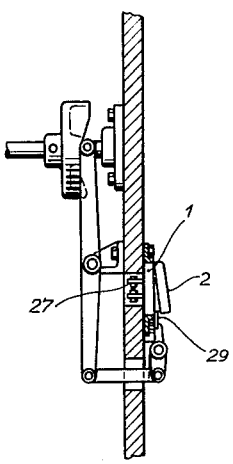
Figure 7:
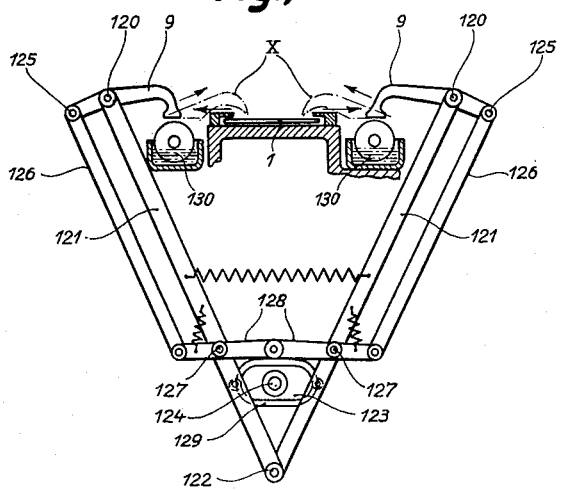
Figure 8:
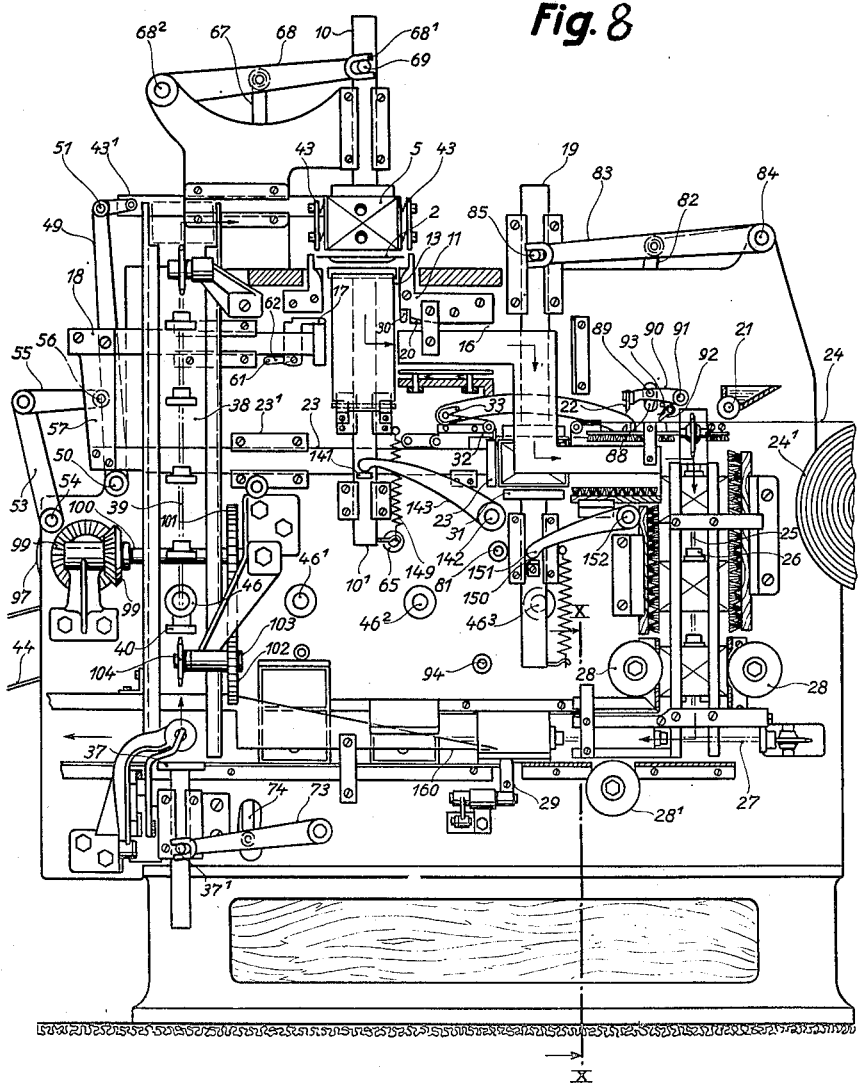
Figure 9:
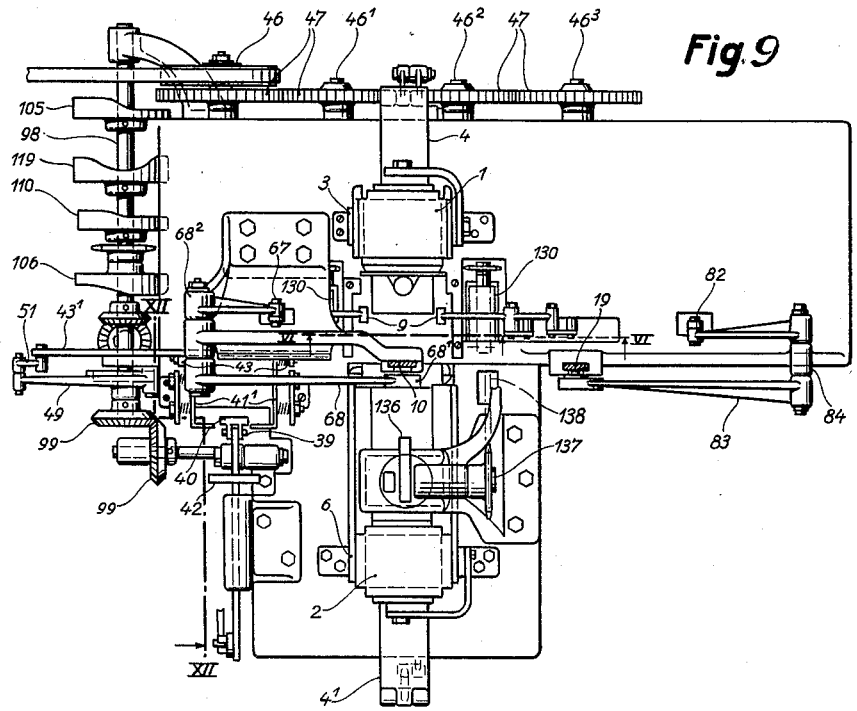
Figure 15:
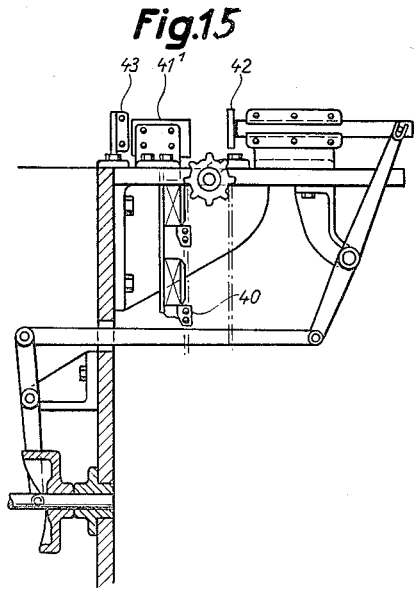
Figure 11:
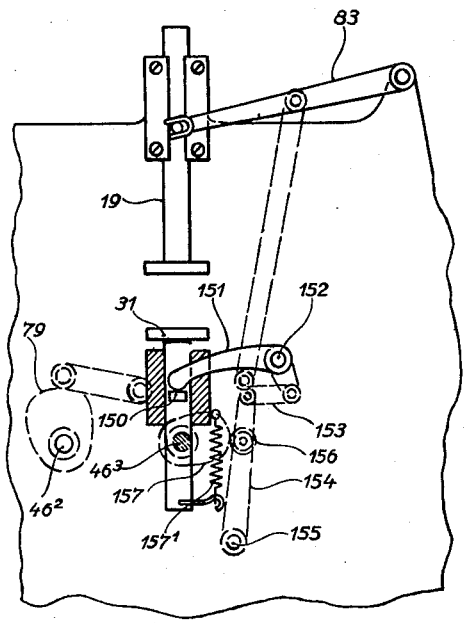
Figure 12:
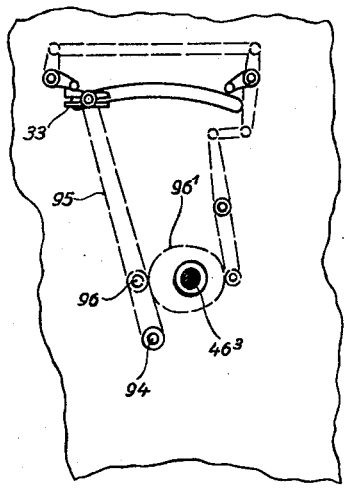
Figure 13:
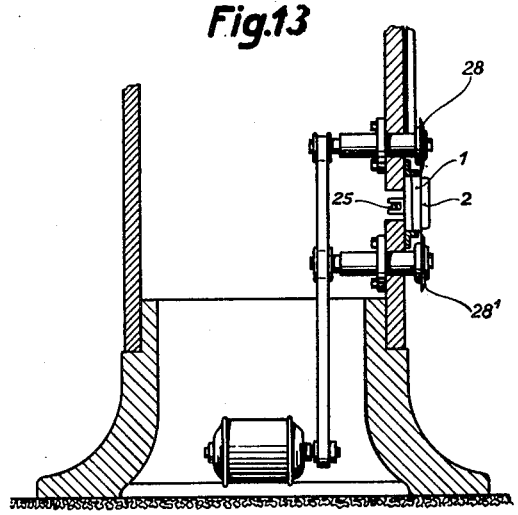

Fig. 6 is a detail of the plan view of Fig. 9;

Fig. 7 is a longitudinal section along line VI—VI of Fig. 9;

Fig. 8 is an elevational view with the lid blank curving apparatus omitted;

Fig. 9 is a top plan view of the machine;

Figs. 10–12 show in detail various of the driving elements of the machine;

Fig. 13 is a longitudinal section along line X—X of Fig. 8 seen in the direction of the arrows;

Fig. 14 is a partial longitudinal section along line XI—XI of Fig. 1 also seen in the direction of the arrows;

Fig. 15 is a partial side elevation seen from the left hand side of Fig. 9;

Fig. 16 shows in perspective, detail of the machine;

Fig. 17 shows a detail of Fig. 2 in a different position during its operation.

Fig. 18 shows a longitudinal section through the shaping channel shown in Fig. 17.

The box blanks, previously stamped in a suitable manner, consist, as shown in Figs. 3 and 4, of two parts, the box part 1 and the lid part 2. The box part is provided with two longitudinal wings 1a, 1b and two transverse wings 1c and 1d.

Flaps 15, 15' are provided on the transverse wings and are joined to the longitudinal wing 1b at the two points 9a, 9b. Longitudinal wings 2a, 2b and transverse wings 2c and 2d of the same width are provided on the lid part 2. The box parts 1 are stacked one above the other in the magazine 3. They are removed therefrom by a slide 4 and passed beneath the former block 5. At the same time a lid blank is removed from the magazine 6 and passed between two presser blocks 7, 8 where it is suitably curved and is then passed under the block 5, until the neck portion 1e of the longitudinal edge 1a of the box part coincides with the longitudinal wing 2b of the lid part. A member 9 then applies an adhesive to the two parts 9a, 9b of the wing 1b of the box part. The block 5 is then pressed down by a ram 10 against the action of a spring controlled counter ram 10', into the die channel 13, both the box parts being pressed by the block 5 and the wings 1c, 1d of the box part being turned over at right angles by a suitably shaped member 11; the two folding members 12 then come into operation and apply the wings 2c, 2d of the lid part to the corresponding parts of the box part. A spring controlled plate 14 causes the lid part to be turned over along the scored edge, whereupon the plate is pressed back by the curved edge of the block 5, and, after the work has passed, the plate returns to its initial position. The ram 10 then rises, the block remaining in the box. The box portion is now finished, with the exception of the longitudinal wings 1b, 2a and flaps 15, 15'. The flap 15 is now turned down by a folding finger 17. The ram 18 then forces the box under a ram 19; the finger 17 moving with it engages with the folding member 30. This is necessary in order to ensure that the flap 15 will pass under the member 30 in the folded position. When the box is moved towards the ram 19, the flap 15' is folded over by the member 30, and then the marginal wings 1b, 2a, which are still erect, are turned down by folding members 20.

In this operation the flaps 15, 15' are pressed on the parts 9a, 9b, to which an adhesive material has been applied and adhere thereto. The ram 19 presses the box downwards, and the lower narrow front side of the box is placed on a previously gummed strip 24 which rests on a spring ram 31. When the ram 19 descends further, the strip 24 is applied to the two narrow sides of the box. The ram 19 is then raised, while the ram 31 with the box remains in the same position. The part of the strip 24 which projects slightly on one side is turned over by a finger 32. The edge strip is completely gummed to the box portion by the latter being pushed forward by the ram 23 into the path of the conveyer 25. The strip is drawn from a bobbin by a reciprocating gripper 33 past a gumming roller 21. After the strip has been attached to three sides of the box it is cut off by a knife 22.

Lugs 26 on the conveyer 25 move the boxes intermittently past the rolling blade 28 whereby the strip on the narrow sides of the box is cut open. Thereupon the conveyer 25 transfers the boxes to another conveyer chain 27 which passes the boxes past another rotary cutter 28' which cuts open the strip on the front longitudinal side of the box. When the box is passed further along a tongue 29 is thrust in the slit formed between the lid and the body of the box and raises the lid, so that a metal finger B having an oblique edge can pass under the lid and as the box continues its path the lid is completely raised.

The block 5 is then removed from the opened box. This can be done by either mechanical, pneumatic, magnetic, or by any other suitable means.

In the present example the block 5 is withdrawn by means of grippers 36 arranged on a slide 35, which, in the position shown in Fig. 2 in dotted lines, seizes the block and places it on a ram 37 which slides the block upwards into a guiding channel 38 after the gripper has been returned into the position shown in full lines in Fig. 2. A conveyer 39 with carriers 40 in the channel 38 engages the block 5 and carries it upwards into the reach of two spring cheeks which, for clearness, have been omitted from Fig. 2. The block 5 is led from thence on guide rails 41, which are more particularly shown in Fig. 6 by a plunger rod 42 in front of the ram 10 where it is held firmly by spring cheeks 43.

The moving parts of the machine are driven in known manner by a motor or the like, a belt 44 driving the main shaft 46 by a pulley 45. Shafts 46', 46², 46³ are mounted at the same level as the main driving shaft 46 and are connected together by gear wheels 47. A cam disc 48 is mounted on the shaft 46 and engages with the lower end 49' of an oscillating lever 49 pivoted at 50. The upper end of the lever 49 is connected by a link 51 with the rod 42. On the shaft 46 there is also a cam disc 52 which engages with a bell crank lever 53. This lever is pivoted at 54 and by means of a link 55 engages at 56 with a bridge piece 57 which connects the two rams 18 and 23. The bearings of the rams 18 and 23 are shown at 18' and 23'. A cam disc 58 is mounted on the shaft 46' and engages with the lower end of a lever 60 pivoted at 59. The upper end of the lever is connected at 61 by a link 62 with a slide on the plunger 18. On the shaft 46' there is also a cam disc 63 which engages with a roller 64 on an oscillating lever 66 pivoted at 65. A link 67 connected to the end 66' of the lever 66 is connected at its other end to a lever 68 oscillating about a pin 68². The forked end 68' of the lever 68 engages a pin 69 on the ram 10. Also, on the shaft 46' there is a cam disc 70 which engages with an oscillating lever 72 pivoted at 71. Levers 72 and 73 are connected by a link 74. The lever 73 engages at 37' with a presser rod 37 and controls the vertical reciprocating movements of the latter. On the shaft 46² there is a cam disc 75 which engages with a roller 76 on a two-armed lever 77. The lever 77 is pivoted on the pin 65 and engages by means of a link 78 with the folding finger 32. Another cam disc 79 also secured to the shaft 46² engages with the left end (as shown in Fig. 1) of a two-armed lever 80 which is pivoted at 81 and is connected with an oscillating lever 83 by a link 82. The lever 83 is pivoted at 84 and engages at 85 with the ram 19. On the shaft 46³ there is a cam disc 86 which engages at 87' with a lever 87 pivoted at 81. A link 88 engages at 87² with the lever 87 and at 89 with the carrier 90 of the knife 22. The carrier 90 is pivoted at 91. In order to prevent the edge strip coming from the bobbin 24' from being crumpled or changed in position during the cutting process, a brake lever 92 is applied to it under the action of a spring 93. A lever 95 pivoted at 94 co-operates by means of a roller 96 with a cam disc 96' on the shaft 46³. The upper end of the lever 95 carries the grippers 33.

The main driving shaft is connected by gear wheels 47 and 97 with a shaft 98 which drives by bevel wheels 99 a shaft 100 which in turn drives through gear wheels 101 and 102 a shaft 103. A sprocket wheel 104 of the conveyer 39 is arranged on the shaft 103. Cam discs 105, 106 which effect the movement of the slides 4, 4' by means of levers 107, 108, 109 are secured to the shaft 98. Also, on the shaft 98 there is a cam disc 110 which engages with a two-armed lever 112 pivoted at 111. The lever 112 is connected by a link 113 with the slide 35 carrying the gripper 36. The gripper 36, of which the jaws are drawn together by a spring 36', is controlled by means of a pin 114, the front conical portion 114' of which lies between the cheeks of the gripper. The rear end of the pin 114 on the right of Fig. 2 is connected with a two-armed lever 115 which is pivoted at 115' to the slide 35. A link 116 engaging the other end of the two-armed lever 115 is fastened at 116' to a double-armed lever 117. The lever 117 is pivoted at 118 and co-operates with a cam 119 on the shaft 98.

The gum distributors 9 of the gumming device, shown on a larger scale in Fig. 7, are pivoted at 120 to oscillating levers 121. The levers 121 which are pivoted at 122 engage with cams 123 on a common shaft 124. Links 126 engage at 125 with the rear ends of the distributors 9 and at 127, by means of two-armed levers 128 mounted on the levers 121, engage also with other cams 129 on the shaft 124. The cams 123, 129 are so adjusted and timed that the front ends of the distributors 9 describe curves shown at $x$ in Fig. 7. The distributors are first drawn over the gumming rollers 130 and then brought down following the upper portion of the curves on the blank 1 and then, similarly, again withdrawn. The shaft 124 is in connection by sprocket wheels 131, 132 and a chain 133 with the shaft 98.

The presser block 7 which is mounted so as to be longitudinally displaceable in a bearing 134 is pressed, by the action of a spring 135 applied to the end 134' of the presser stem, against a cam 136. The cam 136 is arranged on a spindle 137 which is set in rotation by means of a chain 138 and controls the reciprocating movements of the 1 presser block 7. The chain 138, which is led over guide rollers 139, is connected with a sprocket wheel on the shaft 100. The lower part of the chain and the above-mentioned operating sprocket wheel are, for clearness omitted from Fig. 2.

According to Fig. 16, the pusher 4' comprises essentially a prismatic plate that is provided with noses 4² which bring the lid blanks to the matrix 8. The pusher further has the side arms 4³ having pivoted noses 4⁴ which are adapted to engage the flaps 2d and 2c of the lid blank, which overlap the forming matrix 8, by operating on each side of said block. Thus the pusher 4' with its noses 4² pushes a blank from magazine 6 into the forming block and then moves back to original position while the presser block 7 is shaping said blank. The noses 4⁴ of arms 4³ are continuously pushed upwards by spring 140. When the pusher 4 moves back to the original position noses 4⁴ are depressed counter to action of springs 140 by flaps 2d and 2c and rise immediately into the path of said flaps on their other ends. Now when the pusher 4¹ again moves forward the noses 4⁴ push the shaped blank from matrix 8 to the further position under block 5 while noses 4² push a fresh blank onto matrix 8.

In Fig. 10 ram 10¹ is shown provided with nose 141 on which one end of a lever 143 which is pivoted at 142 rests. The free end of lever 143 through link 144 engages the free end of a lever 146 which is pivotally mounted at 145. A roller 147 mounted to lever 146 intermediate its ends, tracks a cam 148 mounted on shaft 46². Thus ram 10¹ may be moved downwardly counter to the action of spring 149 which tends to raise it and the timing and shape of a cam 148 is such that ram 10¹ is kept in its lowermost position long enough to permit pusher 18 to transfer the blanks and block into channel 16 (Fig. 1).

In the same or similar manner as shown in Fig. 11, which latter shows in detail mechanism associated with the rams 31 and 14, ram 31 is kept in lowermost position long enough to permit ram 23 to transfer the box into the path of the conveyor 25 of Fig. 1.

Here ram 31 is provided with a nose 150 on which one end of a lever 151 pivotally supported at 152 rests. The free end of lever 151 through link 153 is connected to the free end of a lever 154 which is pivotally mounted at 155. A roller 156 mounted to lever 154 intermediate its ends tracks cam 157 mounted on shaft 46³ (Fig. 1). The shaping and timing cam 157 is such as to effect holding of ram 31 in lowermost position counter to the action of spring 157¹ in the manner above described.

I claim:—

1. A process of making cigarette cartons without inserted neck strips comprising arranging a box blank having a longitudinal wing provided with a neck portion and a lid blank also having a longitudinal wing so that the said neck portion overlies the latter named longitudinal wing, then folding the blanks about a form and enclosing the latter, then binding the folded blanks together, then cutting open the so bound folded blanks along three edges and then removing the form.

2. A method of making cigarette cartons from box blanks having longitudinal and transverse wings, the latter and one of the former being provided with neck portions, and lid blanks having longitudinal and transverse wings, comprising first arranging a box blank and a lid blank so that the neck portion of the longitudinal wing of a box blank overlies a longitudinal wing of a lid blank, then simultaneously folding the lid blank and box blank to the shape of a carton, then applying a gummed strip to the sides of the carton to bind the folded wings in place and then cutting said strip along three sides at the height of the shoulder formed by the neck portions on said wings.

3. A method of making cigarette cartons from box and lid blanks having longitudinal and transverse wings formed with neck portions comprising first arranging a box blank and a lid blank adjacent each other so that the neck portion of a wing thereof overlies the wing of a lid blank and then simultaneously folding the box blank and lid blank about a former to the carton shape, then applying a gummed strip to the sides of the carton, and then cutting the strip open along three sides of said carton.

4. Apparatus for making cigarettes from box blanks having longitudinal and transverse wings, the latter and one of the former being provided with neck portions, and lid blanks having longitudinal and transverse wings, including means for arranging a box blank and a lid blank so that a neck portion of said box blank overlies a wing of said lid blank, a forming block, means for folding said arranged blanks about said block to form a carton, means for binding the folded blanks in place and means for removing the forming block.

5. Apparatus for making cigarette cartons from box blanks having longitudinal and transverse wings, the latter and one of the former being provided with neck portions, and lid blanks having longitudinal and transverse wings, comprising a shaping channel, means for arranging a box blank and a lid blank over said shaping channel so that the neck portion of the longitudinal wing of said box blank overlies a longitudinal wing of said lid blank, a forming block, means for pushing said forming block and said arranged blanks through said shaping channel to partially form the carton on said block, a second shaping channel, means for pushing said partially formed carton and said block through said second shaping channel to complete the formation of said carton on said block, means for applying a gummed strip about the edges of the carton formed by the wings, means for cutting said edging strip longitudinally along three sides of said carton and means for removing the forming block.

6. Apparatus for making cigarette cartons from box blanks having longitudinal and transverse wings, the latter and one of the former being provided with neck portions, and lid blanks having longitudinal and transverse wings, comprising means for arranging a box blank and a lid blank over a shaping channel so that the neck portion of the longitudinal wing of said box blank overlies a longitudinal wing of said lid blank, a forming block, means for pushing said forming block and said arranged blanks through said shaping channel to fold the latter and the transverse wings of said blanks about said block, a second shaping channel arranged transversely to said first named channel, means for pushing said blanks and forming block through said channel to fold the remaining unfolded wings about said forming block and complete the carton shape, means for applying a gummed strip about the edges of the carton formed by the folded wings, means for cutting said strip longitudinally along three sides of said carton and means for then removing said forming block from the completed carton.

JOHANNES SCHMIEDEL.